US009290216B2

(12) United States Patent
Fairhead

(10) Patent No.: US 9,290,216 B2
(45) Date of Patent: Mar. 22, 2016

(54) SUSPENSION ASSEMBLY FOR PERSONAL TRACKED VEHICLE

(75) Inventor: Ryan James Fairhead, Brampton (CA)

(73) Assignee: BPG RECREATIONAL INC., Oakville, Ontario (CA)

( * ) Notice: Subject to any disclaimer, the term of this patent is extended or adjusted under 35 U.S.C. 154(b) by 0 days.

(21) Appl. No.: 14/111,533

(22) PCT Filed: Apr. 13, 2012

(86) PCT No.: PCT/US2012/033637
§ 371 (c)(1),
(2), (4) Date: Feb. 3, 2014

(87) PCT Pub. No.: WO2012/142497
PCT Pub. Date: Oct. 18, 2012

(65) Prior Publication Data
US 2014/0138169 A1    May 22, 2014

Related U.S. Application Data

(60) Provisional application No. 61/475,054, filed on Apr. 13, 2011.

(51) Int. Cl.
  B62D 55/104    (2006.01)
  B62K 3/00      (2006.01)
  B62M 27/02     (2006.01)
  B62D 55/06     (2006.01)
  B60G 3/20      (2006.01)

(52) U.S. Cl.
  CPC ............ B62D 55/104 (2013.01); B60G 3/20 (2013.01); B62D 55/06 (2013.01); B62K 3/002 (2013.01); B62M 27/02 (2013.01); *B60G 2300/322* (2013.01); *B62M 2027/026* (2013.01); *B62M 2027/027* (2013.01)

(58) Field of Classification Search
  CPC ............................. B62D 55/104; B62M 27/02
  USPC .................. 180/9.54, 9.56; 305/120, 124
  See application file for complete search history.

(56) References Cited

U.S. PATENT DOCUMENTS 1,513,144 A  * 10/1924 Wellman ................. 305/134
1,861,866 A  *  6/1932 Knox et al. .............. 305/133
(Continued)

OTHER PUBLICATIONS

International Search Report and Written Opinion of Jul. 26, 2012 in related PCT application PCT/US2012/033637.
(Continued)

*Primary Examiner* — Joseph Rocca
*Assistant Examiner* — Gabriela C Craciun
(74) *Attorney, Agent, or Firm* — Florek & Endres PLLC

(57) ABSTRACT

A suspension assembly for a personal tracked vehicle comprises a first swing arm pivotally connectable to a frame of the vehicle. The first swing arm has a first end and a second end. A second swing arm is pivotally connectable to the first swing arm. The second swing arm has a first end and a second end. At least one spring member is connected to the first and second swing arms. At least one first wheel is rotatably connected to the first end of the first swing arm. At least one second wheel is rotatably connected to the first end of the second swing arm. The at least one first and second wheels are adapted to be in contact with the same track of the vehicle. The first and second wheels are one of an idler wheel and a drive wheel. Suspensions and personal tracked vehicles are also presented.

15 Claims, 9 Drawing Sheets

(56) References Cited

U.S. PATENT DOCUMENTS

| | | | |
|---|---|---|---|
| 3,063,510 A * | 11/1962 | Hunger et al. | 180/9.1 |
| 3,254,738 A * | 6/1966 | Larsen | 180/9.1 |
| 3,658,145 A * | 4/1972 | Bergmann et al. | 180/193 |
| 3,756,619 A * | 9/1973 | Thorsell | 280/104 |
| 4,093,033 A * | 6/1978 | Rosch | 180/9.56 |
| 4,159,128 A * | 6/1979 | Blaine | 280/5.521 |
| 5,370,198 A * | 12/1994 | Karpik | 180/193 |
| 5,692,579 A * | 12/1997 | Peppel et al. | 180/190 |
| 5,881,834 A * | 3/1999 | Karpik | 180/193 |
| 5,947,217 A * | 9/1999 | Snare et al. | 180/9.56 |
| 6,390,219 B1 * | 5/2002 | Vaisanen | 180/193 |
| 7,128,176 B1 * | 10/2006 | Mills et al. | 180/9.1 |
| 7,395,890 B2 * | 7/2008 | Visscher | 180/193 |
| 7,455,131 B2 * | 11/2008 | Rittenhouse | 180/9.5 |
| 7,854,285 B1 * | 12/2010 | Giese | 180/193 |
| 7,891,454 B2 * | 2/2011 | Giese et al. | 180/193 |
| 8,302,710 B2 * | 11/2012 | Allaire | 180/9.54 |
| 8,820,458 B2 * | 9/2014 | Giese | 180/193 |
| 2003/0159868 A1 * | 8/2003 | Alexander | 180/190 |
| 2006/0169510 A1 * | 8/2006 | Visscher | 180/193 |
| 2007/0199753 A1 * | 8/2007 | Giese et al. | 180/190 |
| 2008/0017431 A1 * | 1/2008 | Sadakuni et al. | 180/193 |
| 2008/0084111 A1 * | 4/2008 | Rainer | 305/124 |
| 2008/0128183 A1 * | 6/2008 | Fairhead | 180/9.23 |
| 2011/0037312 A1 * | 2/2011 | Geraschenko | 305/141 |
| 2011/0048816 A1 * | 3/2011 | Bessette et al. | 180/9.1 |
| 2014/0125118 A1 * | 5/2014 | Nagorcka et al. | 305/125 |

OTHER PUBLICATIONS

International Preliminary Report on Patentability of Mar. 19, 2013 in related PCT application PCT/US2012/033637.

* cited by examiner

SUSPENSION ASSEMBLY FOR PERSONAL TRACKED VEHICLE

TECHNICAL FIELD

The present invention relates to suspension assemblies for personal tracked vehicles.

BACKGROUND

Personal tracked vehicles allow their users, and in some cases a passenger, to travel over rough (and in many cases unimproved) terrain. The best known example of a personal tracked vehicle is a snowmobile. Other types include all-terrain vehicles outfitted with (usually four) tracks instead of wheels and stand-up personal tracked vehicles (such as the one shown in U.S. Pat. No. 7,575,075).

Most convention personal tracked vehicles include a suspension system (or suspension systems) associated with their track or tracks. The suspension systems are designed to absorb at least some of the shocks produced by the vehicle traveling over the irregularities in the terrain. As the vehicle travels over the terrain, the irregularities produce displacements and deflections in its suspension system.

Given the length of time that snowmobiles have been in existence, probably the most advanced suspensions systems in these types of vehicles are found on snowmobiles. In a snowmobile, it is the rear suspension system that supports (in all mass-produced vehicles) a single endless track used to propel the vehicle. The endless track is tensioned and encircles a pair of parallel slide rails, a plurality of idler wheels and at least one drive wheel or sprocket. A shock absorbing mechanism involving compression springs, hydraulic dampers, and/or other shock absorbing elements urges the slide rails and the chassis (also known as a frame) of the snowmobile apart, against the weight supported above the suspension, in a static condition. The snowmobile suspension typically is a four bar linkage. These are only the generally characteristics of a modern snowmobile rear suspension. As those skilled in the art know, there are many detailed differences between the various conventional rear snowmobile suspension systems.

Owing to differences in their construction, other kinds of personal tracked vehicles do not use the same types of suspensions systems to support their tracks as do snowmobiles. Snowmobile rear suspensions are not directly applicable on these vehicles. The conversion kits used to convert standard 4-wheeled ATVs into 4-tracked vehicles (with one track replacing each wheel), typically use the suspension system already on the ATV (used with the wheel) alone, but in some cases do add components to such systems. In any event, they are different than snowmobile track suspension systems.

Different from either are stand-up personal tracked vehicles. Stand-up personal tracked vehicles are the most recent additional to this class of vehicles. As was discussed above, an example of such vehicle is disclosed in U.S. Pat. No. 7,575,075, issued to Fairhead on Aug. 18, 2009, incorporated by reference herein in its entirety. In such a vehicle, there is no seat. There is merely a platform on which the rider stands when using the vehicle. A pair of tracks (one on each side of the vehicle, below the platform) propels the vehicle. The engine is disposed below the platform laterally between the tracks. The user initiates vehicle turns by shifting their weight toward the right or the left, which causes one track to be driven faster than the other. Stand-up tracked vehicles are lighter, smaller and far more compact than snowmobiles and ATVs. For reasons including these, suspension systems similar to the ones used in snowmobiles or ATVs are not appropriate to such vehicles.

While the vehicle of the '075 U.S. patent did have an adequate suspension system, as is typically the case with these types of vehicles (see snowmobiles for example), improvements in suspension systems are always possible.

SUMMARY

It is therefore an object of the present invention to provide a suspension assembly for some types of personal tracked vehicles (particularly stand-up personal tracked vehicles), being an improvement, at least in some respects, over at least some of the prior art.

It is also an object of the present invention to provide a personal tracked vehicle (particularly stand-up personal tracked vehicles) incorporating such a suspension assembly.

In one aspect, embodiments of the present invention provide a suspension assembly for a personal tracked vehicle. The suspension assembly has a first swing arm adapted to be pivotally connected to a frame of the vehicle, the first swing arm having a first end and a second end. A second swing arm is pivotally connected to the first swing arm, the second swing arm having a first end and a second end. At least one shock absorber is connected to the first and second swing arms. The first ends of the first and second swing arms are respectively adapted for rotatable connection of a first and second wheel thereto.

In some embodiments, at least one first wheel is rotatably connected to the first end of the first swing arm, the at least one idler wheel being adapted to be in contact with a corresponding one of the tracks of the vehicle. At least one second wheel is rotatably connected to the first end of the second swing arm, the at least one second wheel being adapted to be in contact with the one of the tracks of the vehicle. In another aspect, the first wheel is one of an idler wheel and a drive wheel and the second wheel is one of an idler wheel and a drive wheel. The drive wheel is adapted to be operatively connected to an engine.

It should be understood that in the present context, a swing arm may be pivotally connected to another component (e.g. the frame, another swing arm, etc.) either directly or indirectly (i.e. through a third component such as a linking element). Both of these constructions are intended to be encompassed by language indicating that the swing arm is "connected" or "adapted to be connected" to another component of the vehicle. As an example, in some embodiments, the first swing arm is adapted to be pivotally connected to at least one longitudinal arm, and the at least one longitudinal arm is fixedly connected to the frame of the vehicle. Further, in some embodiments, irrespective of whether the connection is direct or indirect, the second swing arm is pivotally connected to the first swing arm at a pivot point disposed about half-length of the first and second swing arms.

It should also be understood that in the present context, the language "at least one shock absorber connected to the first and second swing arms" does not require a single shock absorber, multiple shock absorbers are intended to be included. Further, when multiple shock absorbers are present, it is not required that any particular shock absorber interconnect the first and the second swing arms. No such interconnection is required. The first and the second arms need not be interconnected at all. It may simply be that there is a first shock absorber connected to the first swing arm and a second shock absorber connected to the second swing arm (the other end of such shock absorbers may, for example, be directly or indirectly connected to a fixed point on the frame or may be connected to some other movable component of the vehicle suspension. Of course, in some embodiments, the at least one shock absorber does interconnect the second ends of the first and second swing arms. In some embodiments, irrespective of to where the at least one shock absorber is connected, the at least one shock absorber is a shock absorber.

In should also be understood that in the present context, the language "At least one first wheel rotatably connected to the first end of the first swing arm" and other similar language is intended to cover both direct connections and indirect connections (such as where the wheel is rotatably connected to a component that is itself connected (whether fixed or movably) to the end of the swing arm. Thus, for example, in some embodiments, there is at least one connecting arm to which the wheels are rotatably connected, and the at least one connecting arm is pivotally connected to the first end of one of the swing arms. Further, in some embodiments at least one of the at least one first wheel and the at least one second wheel includes two wheels. In some such embodiments, both of the at least one first wheel and the at least one second wheel include two wheels.

In some embodiments, in the suspension assembly, the first swing arm is a plurality of first swing arms wherein each of the plurality of first swing arms is adapted to be pivotally connected to a frame of the vehicle and each of the plurality of first swing arms has a first end and a second end. The first ends of the first swing arms are adapted for rotatable connection of a first wheel thereto. The second swing arm is a plurality of second swing arms wherein each of the plurality of second swing arms is pivotally connected to at least one of the first swing arms and each of the plurality of second swing arm has a first end and a second end. The first ends of the second swing arms are adapted for rotatable connection of a second wheel thereto. At least one shock absorber is connected to the plurality of first and second swing arms.

In some embodiments, the at least one shock absorber has a first end and a second end. The first end of the shock absorber is connected to one of the first swing arms at the second end thereof and the second end of the at least one shock absorber is connected to one of the first swing arms at the second end thereof. In a further aspect, the first end of the shock absorber interconnects the two of the first swing arms and the second end of the shock absorber interconnects two of the second swing arms. In another aspect, the two first swing arms interconnected by the shock absorber are further adapted to receive the at least one longitudinal arm therebetween and to be pivotally connected to at least one longitudinal arm connected to the frame of the vehicle.

Embodiments of the invention also provide a personal dual tracked vehicle (being either a straddle seat vehicle or a stand-up vehicle) including the suspension system of this aspect. In particular, a personal stand-up dual tracked vehicle has a frame. An engine is connected to the frame. A platform is connected to the frame for accommodating a user thereon. A left and right track is operatively connected to the engine. A left and right suspension assembly movably supports the respective track. Each suspension assembly includes: a first swing arm pivotally connected to the frame, the first swing arm having a first end and a second end, a second swing arm pivotally connected to the first swing arm, the second swing arm having a first end and a second end, at least one shock absorber connected to the first and second swing arms. At least one first wheel is rotatably connected to the first end of the first swing arm. At least one second wheel is rotatably connected to the first end of the second swing arm. The at least one first and second wheels contacting the respective tracks.

In some such embodiments the suspension assemblies are middle suspensions assemblies (i.e. suspensions assemblies that are intermediate a front suspension assembly(ies) and a rear suspension assembly(ies) on either side of the vehicle.

In a second aspect, embodiments of the present invention provide a suspension assembly for a personal tracked vehicle. The suspension assembly has: A swing arm is adapted to be pivotally connected to a frame of the vehicle, the swing arm having an end. The end of the swing arm is adapted for rotatable connection of a wheel thereto. At least one shock absorber is connected to the swing arm, the at least one shock absorber being adapted to be connected to the frame of the vehicle. In some embodiments, the suspension assembly is a rear suspension assembly of the vehicle.

In some embodiments, the suspension assembly comprises a wheel rotatably connected to the end of the swing arm and adapted to contact a track of the vehicle. In some embodiments, the wheel is a right wheel adapted to contact a right track of the vehicle; and the suspension assembly further comprises a left wheel adapted to contact a left track of the vehicle, the left wheel being rotatably connected to the end of the swing arm.

In some embodiments, the swing arm is a right swing arm; the at least one shock absorber is an at least one right shock absorber connected to the right swing arm. The suspension assembly further comprises a left swing arm adapted to be pivotally connected to the frame of the vehicle, the left swing arm having an end. The end of the left swing arm is adapted for rotatable connection of a wheel thereto. At least one left shock absorber is connected to the left swing arm and the at least one shock absorber is adapted to be connected to the frame. In some embodiments, a right wheel is rotatably connected to the end of the right swing arm; and a left wheel rotatably connected to the end of the left swing arm. The left and right wheels are adapted to respectively contact a left and right track of the vehicle.

In some embodiments, the suspension assembly further comprises a transversal arm connecting the right and left swing arms.

As was the case with the first aspect, in should be understood that in the present context, components that are physically connected to one another (as opposed to operatively connected to one another) may be either directly connected to each other or indirectly connected to each other via other components. Both of these constructions are intended to be encompassed by language indicating that one component is "connected" or "adapted to be connected" to another.

In some embodiments, the suspension assembly is a rear suspension assembly of the vehicle.

Embodiments of the invention also provide a personal tracked vehicle including the suspension system of this aspect. The vehicle has a frame. An engine is connected to the frame. A platform is connected to the frame for accommodating a user thereon. A track is operatively is connected to the engine. A suspension assembly movably supports the track. The suspension assembly includes: a swing arm pivotally connected to the frame, the swing arm having an end; and a wheel operatively connected to the engine, the wheel being rotatably connected to the end of the swing arm, the drive wheel contacting the track; and at least one shock absorber connected to the swing arm and to the frame.

In some embodiments, the track is a right track, the wheel is a right wheel and the right wheel contacts the right track. The vehicle further comprises a left track operatively connected to the engine; a left wheel contacting the left track of the vehicle, and the left wheel being rotatably connected to the end of the swing arm. A left wheel is rotatably connected to the end of the left swing arm, the left wheel contacting the track, and at least one shock absorber is connected to the left swing arm and to the frame.

In some embodiments, the left wheel is independently operatively connected to the engine from the right wheel.

In some embodiments, the suspension assembly further comprises a transversal arm connecting the right and left swing arms.

In a third aspect, embodiments of the present invention provide a suspension assembly for a personal tracked vehicle. The suspension assembly has a swing arm adapted to be pivotally connected to a frame of the vehicle, the swing arm having an end. The suspension assembly also has at least one connecting arm pivotally connected to the end of the swing arm; the at least one connecting arm having a first end and a second end adapted for rotatable connection of a wheel; and at least one shock absorber connected to the swing arm, the at least one shock absorber being adapted to be connected to the frame.

In some embodiments, a first wheel is rotatably connected to one end of the at least one connecting arm, the first wheel contacting the track. A second wheel is rotatably connected to another end of at least one connecting arm, the second wheel contacting the track.

As was the case with the first and second aspects, in should be understood that in the present context, components that are physically connected to one another (as opposed to operatively connected to one another) may be either directly connected to each other or indirectly connected to each other via other components. Both of these constructions are intended to be encompassed by language indicating that one component is "connected" or "adapted to be connected" to another.

In some embodiments, when the vehicle is in operative condition on flat level ground without a user, a point of rotation of the first wheel is closer to the ground than a point of rotation of the second wheel. In some embodiments the first wheel and the second wheel are horizontally offset from one another to create an angle of attack for the one of the pair of tracks. In some embodiments the first wheel has a diameter smaller than the second wheel. In some embodiments the first wheel and the second wheel have equal diameters.

Embodiments of the invention also provide a personal dual tracked vehicle including the suspension system of this aspect. The vehicle has a frame. An engine is connected to the frame. One of a straddle seat and a platform is connected to the frame for accommodating a user thereon. A track is operatively connected to the engine. A suspension assembly movably supports the track. The suspension assembly includes a swing arm pivotally connected to the frame, the swing arm having an end; at least one connecting arm pivotally connected to the end of the swing arm; a first wheel rotatably connected to one end of the at least one connecting arm, the first wheel being in contact with the track; a second wheel rotatably connected to another end of the at least one connecting arm, the second wheel being in contact with the track; and at least one shock absorber connected to the swing arm, the at least one shock absorber being connected to the frame.

In some embodiments, the track is a right track, the suspension assembly is right suspension assembly; the swing arm is a right swing arm; the at least one connecting arm is an at least one right connecting arm; the first and second wheels are first and second right wheels; the at least one shock absorber is an at least one right shock absorber. The vehicle further comprises a left suspension assembly, a left swing arm, and first and second left wheels, and at least one shock absorber connected to the left swing arm and to the frame. In some embodiments, the left and right suspension assemblies are left and right front suspension assemblies.

In should be understood that the above three aspects are not mutually exclusive, nor are they mutually required. Thus, some embodiments, for example, combine the first and second aspects above, others combine the first and third aspects above, others combined the second and third aspects above, still others combine the first, second, and third aspects above, yet others have only one of the first, second, and third aspects above.

In some embodiments, when all three aspects are included in a personal tracked vehicle, the engine is disposed laterally between the left and right middle suspension assemblies, and longitudinally between the left and right front suspension assemblies and the rear suspension assembly. In some embodiments, a left longitudinal arm is connected to the frame, the left longitudinal arm having a front end and a rear end; and a right longitudinal arm is connected to the frame, the right longitudinal arm having a front end and a rear end. The left middle suspension assembly is pivotally connected to the frame via the left longitudinal arm. The right middle suspension assembly is pivotally connected to the frame via the right longitudinal arm. The left front suspension assembly is pivotally connected to the frame via the front end of the left longitudinal arm. The right front suspension assembly is pivotally connected to the frame via front end of the right longitudinal arm. The rear suspension assembly is pivotally connected to the frame via the rear ends of the left and right longitudinal arms. In some embodiments, each of the left longitudinal arm and the right longitudinal arm includes at least one portion arched upwardly. In some embodiments, the left and right longitudinal arms are connected by at least one transverse arm connected to the frame.

For purposes of this application, terms related to spatial orientation such as forwardly, rearwardly, upwardly, downwardly, left, and right, are as they would normally be understood by a rider of the vehicle standing thereon in a normal riding position.

For purposes of this application, a 'personal track vehicle' should be understood as a tracked vehicle accommodating one or two person for recreational use. Such personal tracked vehicles may include snowmobiles, tracked ATVs, or stand-up tracked vehicles. For example, snow groomers, tanks, earth movers or bulldozers are not personal tracked vehicles.

For the purposes of this application, the wheel included in any of the embodiments can be one of an idler wheel and a drive wheel. The drive wheel is adapted to be operatively connected to an engine. When the suspension assembly comprises a left and right suspension assembly, the corresponding left and right wheels of the left and right suspension assembly are one of an idler wheel and a drive wheel. Furthermore, all of the wheel in any particular embodiment may be idler wheels.

For the purposes of this application, a shock absorber at least comprises a spring member. The shock absorber may further include damping elements such as hydraulic dampers and the like, and/or other shock absorbing elements. The shock absorber may also have a housing and other fittings or connection elements to enable its installation.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Although a personal stand-up dual tracked vehicle is being described herein, it is contemplated that other embodiments include other different kinds of personal tracked vehicles, such as a platform single tracked vehicle, or a straddle dual tracked vehicle.

Figure 1:
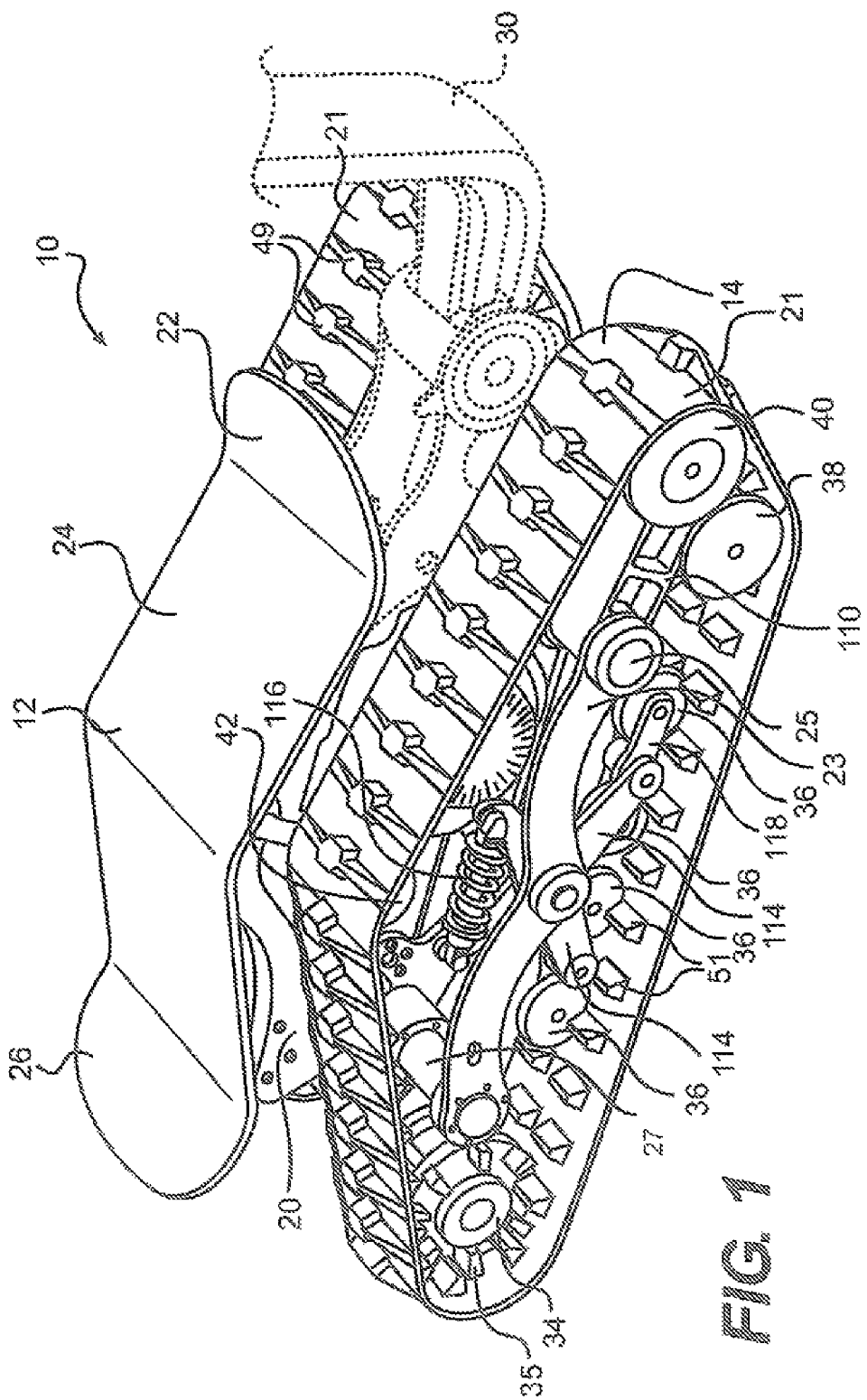
FIG. 1 is a perspective view taken from a front, right side of a personal tracked vehicle having an embodiment of a suspension assembly with a handlebar shown partially in dotted lines.
Figure 2:
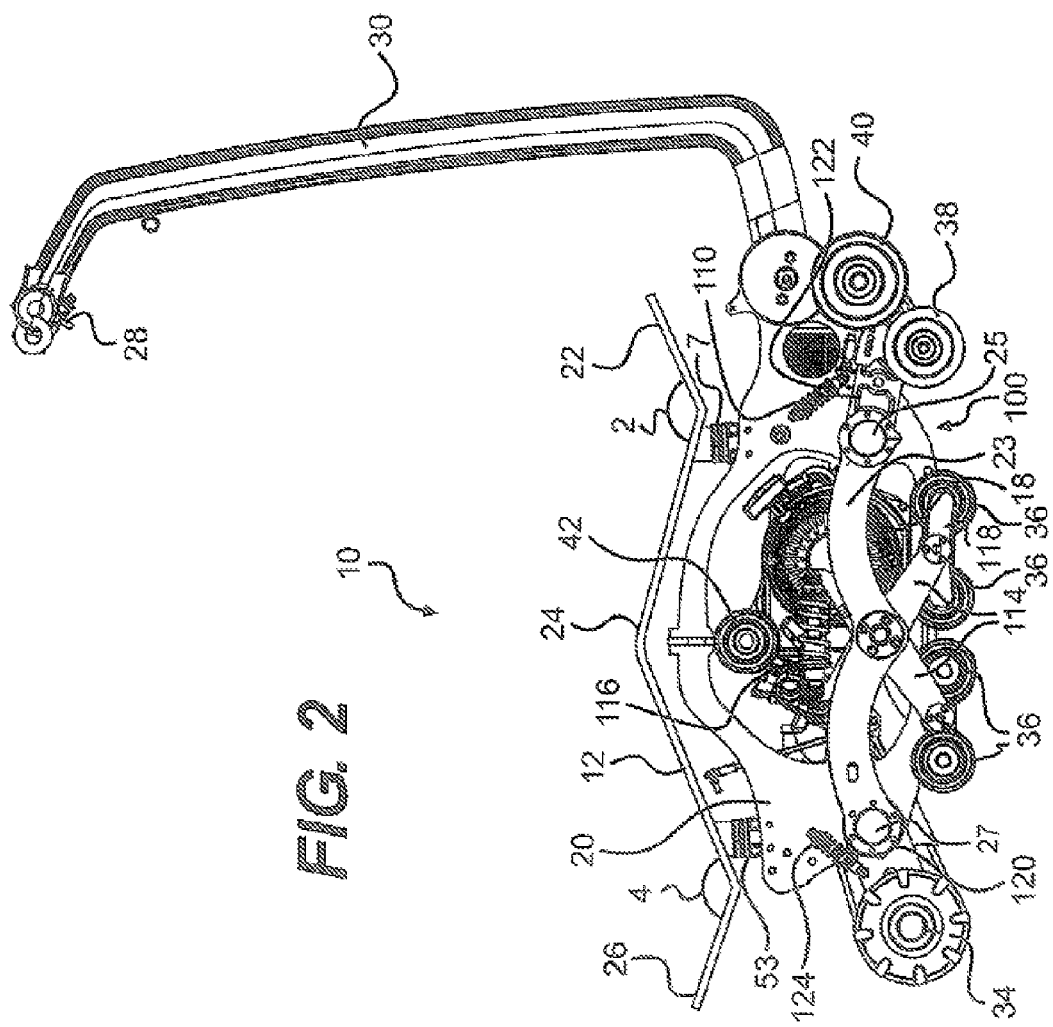
FIG. 2 is a right side elevation view of the vehicle of FIG. 1 with tracks removed for clarity.

Referring to FIGS. 1 and 2, a personal tracked vehicle 10 will be described. The vehicle 10 has right and left tracks 14 and 16 over which a platform 12 is mounted. The platform 12 extends from near the front to near the rear of each of the tracks 14, 16, and is disposed slightly toward the rear of the tracks 14, 16. It is contemplated that the platform 12 could be disposed centrally between the front and rear of the tracks 14, 16, or in other positions with respect to the tracks 14, 16. A drive engine 18 is located between the tracks 14, 16 below the platform 12. The engine 18 is disposed inside a housing 20 (best shown in FIG. 2). In this embodiment, the housing 20 is a frame of the vehicle 10. In other embodiments, the housing 20 could constitute part of the frame of the vehicle 10. In yet other embodiments, the housing 20 could be separate from the frame. The housing 20 is made of steel and has a plurality of apertures for reducing its weight. It is contemplated that the housing 20 could be made of a different material. For example, the housing 20 could be made of aluminum. The platform 12 is pivotally connected to the top of the housing 20. As will be described below, pivoting the platform 12 results in steering the vehicle 10. It is contemplated that the platform 12 could be fixed to the housing 20 and that steering could be achieved by a control located on the vehicle 10. The platform 12 will be described in greater detail below.

The right track 14 and the left track 16 are mounted to the housing 20 such that the engine 18 is positioned between the tracks 14, 16 substantially in the center of the vehicle 10. A positioning of the engine 18 and other components between the tracks 14, 16 below the platform 12 allows the vehicle 10 to have a center of gravity disposed generally low for increased stability while riding the vehicle 10.

A handlebar 30 (shown in FIG. 2) with a throttle control 28 controls the engine 18. The handlebar 30 extends upwards so that the throttle control 28 is at a level of hands of the user when the user is in the standing position and the handlebar 30 is vertically upright. Alternatively, the vehicle 10 may also be provided with a cable connected to the throttle control instead of the handlebar 30. It is contemplated that the engine 18 could be offset from the center of the vehicle 10.

The vehicle 10 also includes a suspension assembly 100, which will be described in greater detail below.

Still referring to FIGS. 1 and 2, the tracks 14 and 16 each include an endless belt 21. A width of the endless belts 21 is larger than a width of platform 12 to provide a stable footing. It is contemplated that the platform 12 could be wider than the endless belts 21. The endless belts 21 are made of a fibre reinforced polymer material such as rubber. It is contemplated that the endless belts 21 could be made of a different material. The endless belts 21 are provided with a plurality of transversal traction elements 49 on an outer surface 17 thereof, and two rows of aligning members 51 on an inner surface 19 thereof. It is contemplated that the traction elements 49 and the aligning members 51 could have shapes and layouts different from the ones shown in the Figures. The tracks 14, 16 contact each idler wheel 36, 38, 40 and 42. The right track 14 contacts a right drive wheel 34, and the left track 16 contacts a left drive wheel 32. The idler wheels 36, 38, 40 and 42 are standard track wheels configured to cooperate with the aligning members 51 of the tracks 14, 16 so as to ensure that the tracks 14, 16 do not accidentally dislodge from the idler wheels 36, 38, 40 and 42. The drive wheels 32, 34 are operatively connected to track drives 58, 60 for driving the tracks 14, 16 in motion. The track drives 58, 60 will be described in greater detail below. As will be described below, the drive wheels 32, 34 and the idler wheels 36, 38, 40 are movable with respect to the housing 20 as they also are part of the suspension assembly 100. The idler wheels (left and right for the left and right tracks 16, 14 respectively) 42, however, are fixed with respect to the housing 20 by a bracket (not shown) mounted to the housing 20. The idler wheels 42 enable the tracks 14, 16 to pass vertically above the engine 18. The idler wheels 42 contact a central portion of the inner surface 19 of the endless belt 21 defined between the two rows of alignment members 51. It is contemplated that the idler wheels 42 could contact other parts of the endless belts 21.

Figure 4C:
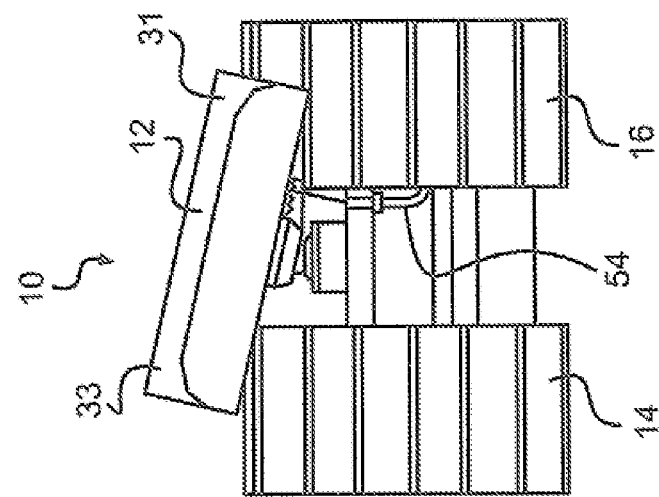
FIG. 4C is a schematic front elevation view of the vehicle of FIG. 1 with the platform of the vehicle in a third position.
Figure 4B:
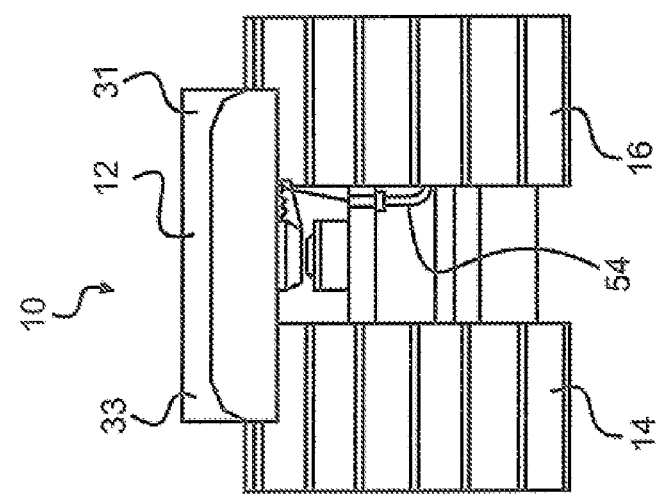
FIG. 4B is a schematic front elevation view of the vehicle of FIG. 1 with the platform of the vehicle in a second position.
Figure 4A:
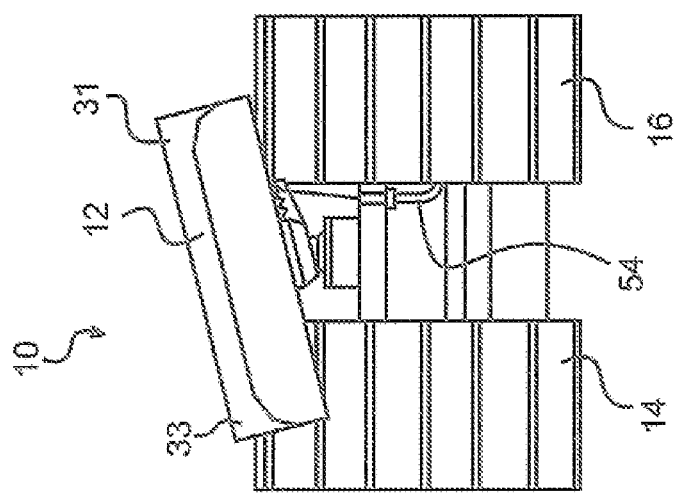
FIG. 4A is a schematic front elevation view of the vehicle of FIG. 1 with the platform of the vehicle in a first position.

Still referring to FIGS. 1 and 2, the platform 12 has a forward portion 22, a rearward portion 26 and a central portion 24. The platform 12 has a right side 33 and a left side 31 (both shown in FIG. 4A). The forward portion 22 and the rearward portion 26 are upraised compared to the central portion 24. The forward portion 22 is positioned with respect to the central portion 24 at an angle 2 of 120 degrees. It is contemplated that the angle 2 could have a different value, greater than 90 degrees. The rearward portion 26 is positioned with respect to the central portion 24 at an angle 4 of 120 degrees. It is contemplated that the angle 4 could have a different value, greater than 90 degrees. It is also contemplated that the angles 2 and 4 could have different values from each other.

The forward portion 22 and the rearward portion 26 act as front and rear foot rests, respectively. The forward portion 22 and the rearward portion 26 may be provided with a lining that prevents the feet from easily slipping out of their position on the forward portion 22 and the rearward portion 26. When riding the vehicle 10, the user places his/her feet on the forward and rearward portions 22, 26 such that the central portion 24 is disposed between his/her legs. The user usually twists his/her torso with respect to his/her legs so as to be perpendicular to the longitudinal axis 15 and to look forward, similar to what one would do while riding a skateboard. The positioning of the feet on the forward and rearward portions 22 and 26 at angles on opposite sides of the platform 12 permits the user to control the tilting of the board while minimizing chances that the user becomes unbalanced.

The central portion 24 is arched upwards to provide a clearance for the tracks 14, 16 and room for the engine 18. In the Figures, the central portion 24 is shown to have an apex. However, it is contemplated that the central portion 24 could have a curved shape, or be flat.

The platform 12 is mounted to the housing 20 by left and right front pivoting connectors 7 and left and right rear pivoting connectors 53. The platform 12 is selectively tiltable between a first position where the right side 33 of the platform 12 is below a left side 31 of the platform 12 (shown FIG. 4A) and a second position where the left side 31 of the platform 12 is lower than the right side 33 of the platform 12 (shown FIG. 4C). The connectors 7 and 53 are spring biased such that the platform 12 is biased towards a horizontal position where both left and right sides 31, 33 of the platform 12 are horizontally aligned (shown FIG. 4B). Depending on a position of the platform 12 as determined by the weight the user is applying to the left or right sides 31, 33 of the platform 12, a transmission 52 steers the vehicle 10 by selectively driving one track 14, 16 faster than the other 16, 14. It is contemplated that the vehicle 10 could not be capable to drive one track 14, 16 faster than the other 16, 14. The transmission 52 will be described in greater detail below.

Figure 3:
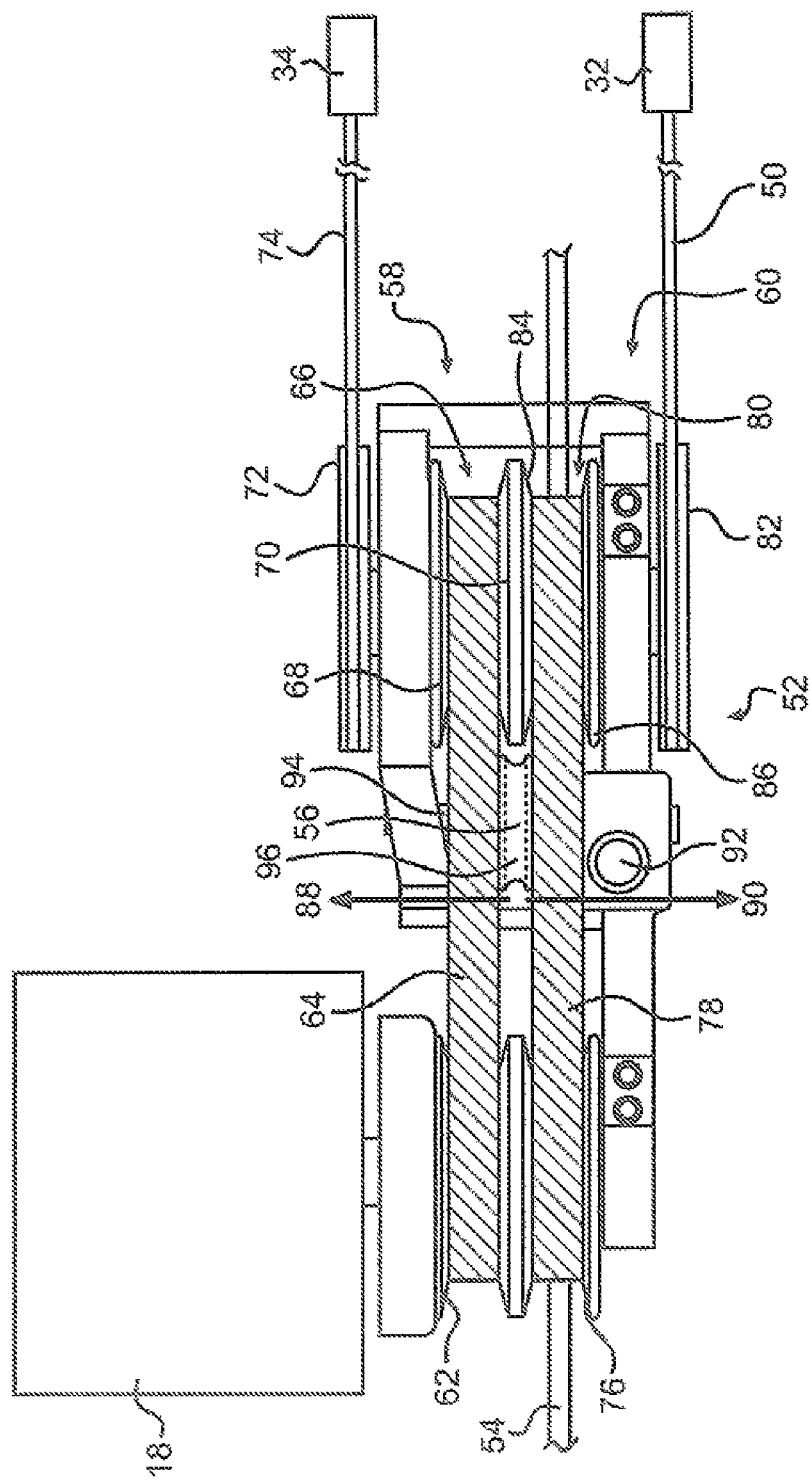
FIG. 3 is a schematic top plan view of a drive assembly of the vehicle of FIG. 1.

Turning now to FIG. 3, the transmission 52 and the track drives 58, 60 will be described.

The transmission 52 includes two variable continuous transmissions, namely the right track drive 58 and the left track drive 60. The use of continuously variable transmissions allows the user to smoothly steer the vehicle 10. It is contemplated that the transmission 52 could not have continuously variable transmissions.

The transmission 52 can selectively activate the drive track 58, 60 to drive the tracks 14, 16 at the same speed or with one track 14, 16 faster than the other 16, 14. The transmission 52 is selectively operable between a left drive bias mode, and a right drive bias mode. In the left drive bias mode, the left track 16 is driven faster than the right track 14. In the right drive bias mode, the right track 14 is driven faster than the left track 16. A differential 56 selectively operates the transmission 52 between its left and right drive bias modes by moving the differential 56 between a first and second position, respectively. The differential 56 is connected to the platform 12 by a tension cable 54. The cable 54 moves in response to the tilting of the platform 12, which in turn moves the differential 56 between the first and second position. When the differential 56 is moved between its first and second position, the transmission 52 is operated between its left bias and right bias modes respectively. Thus, when the platform 12 is tilted to the right, the transmission 52 is operated towards the left drive bias and when the platform 12 is tilted to the left, the transmission 52 is operated towards the right drive bias. By coupling the transmission 52 to the platform 12, the user operates and steers the vehicle 10 using a plurality of intuitive movements, similar to when the user shifts his/her body weight to operate a skateboard or a snow board. By tilting the platform 12 toward the right or left sides 33, 31 by shifting the user's body weight, the vehicle 10 can execute sharper turns with less likelihood of the user falling off the vehicle 10. The cable 54 is spring biased to ensure that it is always under tension to ensure that the tilting motion of platform 12 is accurately translated into the shifting between the right and left drive biases. It is contemplated that the cable 54 could not be spring loaded.

The right track drive 58 operates the right track 14 via the right drive wheel 34. A chain 74 is operatively connected to the transmission 52 which is in turn is operatively connected to the engine 18. The right track drive 58 includes a pulley 62, a belt 64, a variable diameter pulley 66, a cog 72 and the drive chain 74. The pulley 62 is operatively connected to the engine 18. The drive chain 74 is operatively connected to the right drive wheel 34 for entraining the right track 14. The variable diameter pulley 66 is operatively connected to the cog 72. The variable diameter pulley 66 includes two sheaves (or cones) 68 and 70 disposed in a facing relationship. Bringing the sheaves 68 and 70 toward each other has the effect of increasing an effective diameter of the pulley 66 which in turn speeds up the right track 14 by speeding up the variable diameter pulley 66, the cog 72 and the drive chain 74. In an opposite fashion, moving the sheaves 68 and 70 away from each other has the effect of decreasing an effective diameter of the variable diameter pulley 66, which in turn slows down the right track 14 by slowing down the variable diameter pulley 66, the cog 72 and the drive chain 74.

The left track drive 60 operates the left track 16 via the left drive wheel 32. A chain 50 is operatively connected to the transmission 52. The left track drive 60 includes a pulley 76, a belt 78, a variable diameter pulley 80, a cog 82 and a drive chain 50. The drive chain 50 is operatively connected to the left drive wheel 32 for entraining the left track 16. The variable diameter pulley 80 includes two sheaves (or cones) 84 and 86 disposed facing each other. The variable diameter pulley 80 operates in a manner similar to the one of the variable diameter pulley 66, and will not be described herein again.

The variable diameter pulleys 80 and 66 are coaxially aligned and adjacent to one another, such that the sheaves 70 and 84 are adjacent to one another. The sheaves 70 and 84 are connected to the differential 56. The differential 56 consists of a gear like member 96 which has a groove dimensioned to engage both sheaves 70 and 84 simultaneously. The member 96 is rotatably mounted to a shaft 94 which is operatively connected to a cam 92. The shaft 94 is movable between a first position in the direction of arrow 88 and a second position in the direction of arrow 90. The cam 92 is operatively connected to the cable 54. Thus, moving the cable 54 causes the cam 92 to move, which in turn moves the member 96 in the directions 88 or 90. When the member 96 is moved in the direction 88, the diameter of variable diameter pulley 66 increases and the diameter of variable diameter pulley 80 decreases, which in turn causes the drive chain 74 to slow down and the drive chain 50 to speed up, corresponding to the left drive bias. When the member 96 is moved in direction 90, the diameter of the variable diameter pulley 66 decreases and the diameter of variable diameter pulley 80 increases, which in turn causes the drive chain 74 to speed up and the drive chain 50 to slow down, corresponding to the right drive bias.

Hence, the transmission 52 and differential 56 can be selectively operated between the left and right drive bias simply by moving the cable 54.

Turning now to FIGS. 5 to 9, the suspension assembly 100 will be described.

The suspension assembly 100 comprises left and right front suspensions assemblies 102, left and right middle suspension assemblies 104, and a single rear suspension assembly 106. It is contemplated that the suspension assembly 100 could include only one front suspension assembly 102. It is also contemplated that the middle suspension assemblies 104 and/or the rear suspension assembly 106 could be omitted. It is contemplated that the suspension assembly 100 could include two rear suspension assemblies 106. It is contemplated that the suspension assembly 100 could include a left and a right rear suspension assembly 106. In some embodiments, the right and left rear suspension assemblies 106 could operate independently. It is also contemplated that in some embodiments, the left and right front suspensions assemblies 102 and/or the left and right middle suspensions 104 assemblies 102 could be coupled to each other.

The left and right middle suspension assemblies 104 are disposed on external sides of the tracks 16, 14 so as to create a compartment 109 that houses the engine 18, the transmission 52 and other components laterally between them below the idler wheels 42. The front suspension assemblies 102 are disposed forward of the compartment 109, and the rear suspension assembly 106 is disposed rearward of the compartment 109.

A front transversal tube 25 and a rear transversal tube 27 extend transversally through the vehicle 10. The front suspension assemblies 102 are pivotally connected to the front transversal tube 25, and the rear suspension assembly 106 is pivotally connected to the rear transversal tube 27. It is contemplated that the front suspension assemblies 102 and/or the rear suspension assembly 106 could be directly connected to the housing 20. A bushing bearing (not shown) is disposed between the front and rear suspension assemblies 102, 106 and the transversal tubes 25, 27. The transversal tubes 25, 27 are made of steel. It is contemplated that the transversal tubes 25, 27 could be made of aluminum, composite material, or even plastic. It is contemplated that the bearing could be replaced by another type of bearing, such as a ball bearing.

A right longitudinal arm 23 extends fixedly between right ends of the front and rear transversal tubes 25, 27 to support the right middle suspension assembly 104. A left longitudinal arm 23 extends fixedly between left ends of the front and rear transversal tubes 25, 27 to support the left middle suspension assembly 104. The left and right longitudinal arms 23 and the left and right transverse tubes 25, 27 could be considered part of the frame of the vehicle. The left longitudinal arms 23 being a mirror image of the right longitudinal arms 23, only reference to the right longitudinal arm 23 will be made. The right longitudinal arm 23 supports the right middle suspension 104 about half length thereof. The right longitudinal arm 23 is bolted to the front and rear transversal tubes 25, 27. The right longitudinal arm 23 is made of aluminum. It is contemplated that the right longitudinal arm 23 could be made of steel or a composite material. It is contemplated that the right longitudinal arm 23 could be press-fit to the front and rear transversal tubes 25, 27. It is contemplated that the right longitudinal arm 23 could be made of two arms fixedly connected to each other at a location of the middle suspension assemblies 104. It is also contemplated that the right longitudinal arm 23 could be omitted and the right middle suspensions 104 could be connected to the housing 20 directly. It is contemplated that the vehicle 10 could have a pair of adjacent right longitudinal arms 23 sandwiching the right middle suspension assembly 104. The two right longitudinal arms 23 could then be bolted to each other along their length, and an aperture located about mid-length of the right longitudinal arms 23 could accommodate the right middle suspension assembly 104.

Still referring to FIGS. 5 to 9, the front suspension assemblies 102 will be now described in detail. The left front suspension assembly 102 being a mirror image of the right front suspension assembly 102, only the right front suspension assembly 102 will be described herein.

The right front suspension assembly 102 includes a front swing arm 110, front arm 112 (shown in FIG. 6), front transversal arms 111, 113 (shown in FIG. 6) and the front idler wheels 38, and 40. The front swing arm 110, the front arm 112, and the front transversal arms 111, 113 are all made of aluminum. The front idler wheels 38, 40 are made of plastic. It is contemplated that the front swing arm 110, the front arms 111, 112, 113 and the front idler wheels 38, 40 could be made of different materials. For example, some or all of the swing arms 110, 11, 113 could be made of plastic, carbon fibre, or fibreglass, and the idler wheels 38, 40 could be made of metal or of a metal covered with rubber.

The front swing arm 110 has one end pivotally connected to the front transversal tube 25 at pivot point 130, and the other end pivotally connected to the front arm 112 about pivot point 132. The front swing arm 110 is free to rotate about the pivot point 130, but it is contemplated that the front swing arm 110 could have one or more stoppers so as to restrict its motion past predetermined angular limits.

Figure 6:
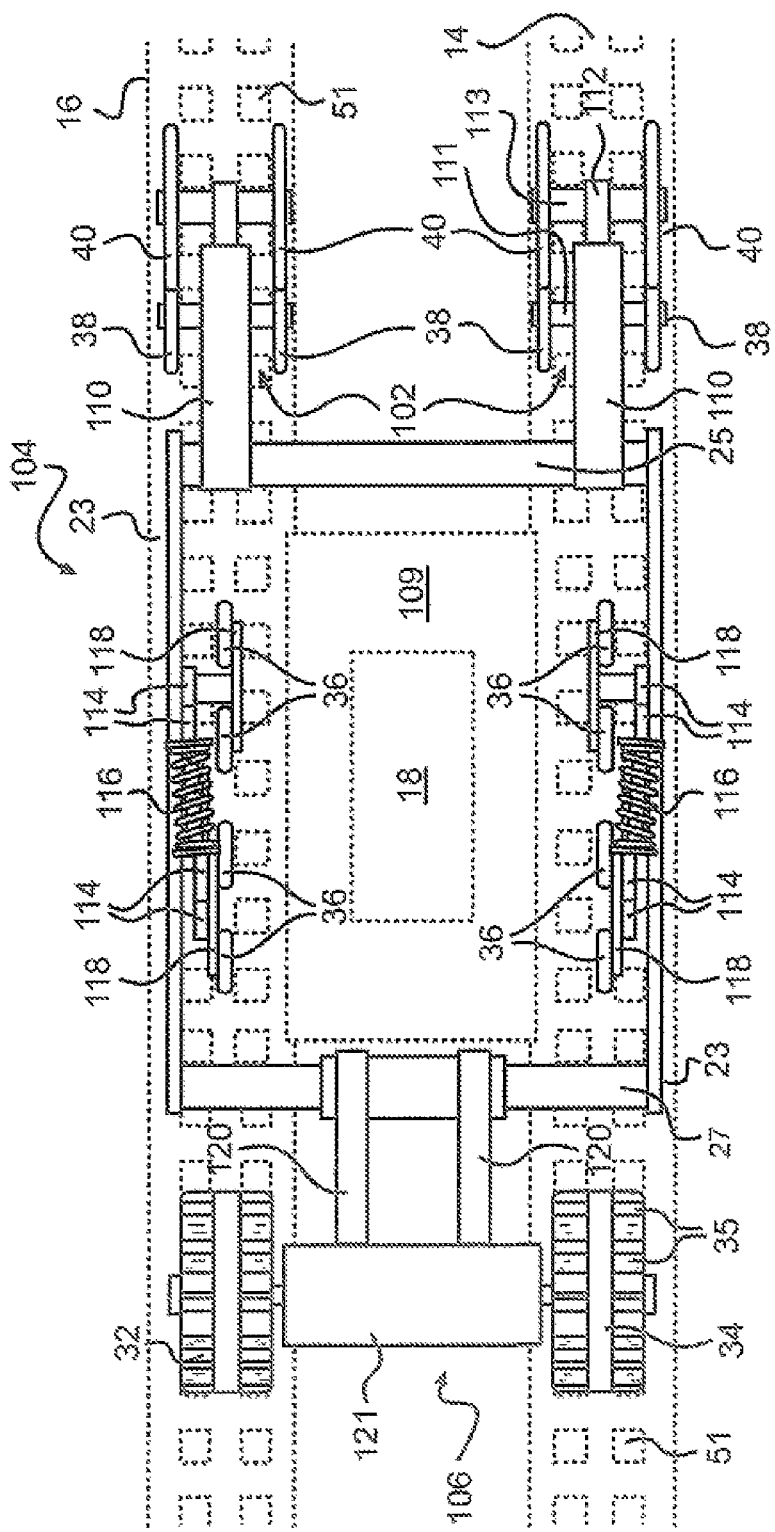
FIG. 6 is a top plan view of the embodiment of the suspension assembly of the vehicle of FIG. 1, with tracks of the vehicle shown in dotted lines for clarity.

An upper end of the front arm 112 is fixedly connected to the front transversal arm 113. The front transversal arm 113 is press-fit to the front arm 112. It is contemplated that the front transversal arm 113 could be bolted to or integrally formed with the front arm 112. The front transversal arm 113 receives two front idler wheels 40 at each end thereof, so that the front idler wheels 40 runs onto side portions of the inner surface 19 of the endless belt 21. As best seen in FIG. 6, the front idler wheels 40 are in contact with outer sides of the alignment members 51. It is contemplated that the front idler wheels 40 could nm on a different portion of the endless belt 21. It is contemplated that a connection between the front swing arm 110 and the front arm 112 could be fixed.

A lower end of the front arm 112 is fixedly connected to a front transversal arm 111 which receives two front idler wheels 38 at each end thereof. The front transversal arm 111 is similar to the front transversal arm 113 and will not be described herein in detail. Similar to the front idler wheels 40, the front idler wheels 38 are positioned on the inner surface 19 of the endless belt 21 to contact with outer sides of the alignment members 51. It is contemplated that the front idler wheels 38, 40 could run on a different portion of the endless belt 21.

The front idler wheels 38, 40 are rotatable with respect to the front arm 112 about respective pivot points 138, 140. The front idler wheel 38 is vertically below the front idler wheel 40, so that the pivot point 138 is vertically below the pivot point 140. The front idler wheel 40 has a diameter greater than the idler wheel 38. The arrangement with the two front idler wheels 38, 40 and a difference of diameters between the front idler wheels 38, 40 allows the right front suspension assembly 102 to accommodate various slopes of the ground on which the vehicle 10 operates by providing the right track 14 with an angle of attack. It is contemplated that the front suspension assemblies 102 could have only one or more than two idler wheels. It is also contemplated that the front idler wheels 38, 40 could have the same diameter.

A front shock absorber 122 (shown in FIGS. 2, 5 and 9) has one end pivotally connected to the front swing arm 110 and another end pivotally connected to the housing 20. In other embodiments, the front shock absorber is pivotally connected to the front swing arm 110 at one end and pivotally connected to the longitudinal arm 23 (or another part of the frame) at another end. The front shock absorber 122 transmits the weight of the user to the right front suspension assembly 102, especially when the user leans forward on the forward portion 22 of the platform 12. It is contemplated the front suspension assemblies 102 could have more than one front shock absorber 122. It is also contemplated that the front shock absorber 122 could be disposed somewhere else on the vehicle 10. For example, the front shock absorber 122 could be disposed between the platform 12 and the housing 20, or between the platform 12 and the right longitudinal arm 23. It is contemplated that the shock absorber 122 could not be directly connected to the housing 20 and/or the front swing arm 110.

When the vehicle 10 is at rest on a flat ground, the front swing arm 110 is disposed at an angle 6 with respect to a horizontal 1. The angle 6 is disposed below the horizontal 1 so as to maintain tension in the right track 14. When the front swing arm 110 is positioned above the horizontal 1, the right track 14 is less tensioned than when disposed below the horizontal 1. This situation may occur when the vehicle 10 is driven on a sudden sharp irregularity. As the ground presents irregularities, the front idler wheels 38, 40 rotate in directions 150 (upwards for a raised irregularity and downward for a lowered irregularity), and the front swing arm 110 in directions 152 (upwards for a raised irregularity and downward for a lowered irregularity) to accommodate these irregularities. When the vehicle 10 encounters a small irregularity, the front arm 112 only pivots about the front swing arm 110 in the directions 150 and the front swing arm 110 stays unmoved. However, when the vehicle 10 encounters a bigger irregularity, the front swing arm 110 pivots about the front longitudinal arm 23 in the directions 152.

Still referring to FIGS. 5 to 9, the rear suspension assembly 106 will be described in detail.

The rear suspension assembly 106 includes a pair of rear swing arms 120 (left and right), a rear transversal arm 121 and the left and right drive wheels 32, 34. The rear swing arms 120 and the rear transversal arm 121 are made of aluminum. The drive wheels 32, 34 are made of plastic. It is contemplated that the rear swing arm 120, the rear transversal arm 121, and the drive wheels 32, 34 could be made of different materials. For example, the swing arms 120 and/or the rear transversal arm 121 could be made of plastic or a composite material the drive wheels 32, 34 could be made of metal or metal covered with rubber. It is contemplated that the rear suspension assembly 106 could have more than one drive wheel. It is also contemplated that the pair of rear swing arms 120 could include only one arm. A left side of the rear suspension 106 being a mirror image of a right side of the rear suspension 120, only the right side will be described herein.

The rear swing arm 120 has one end pivotally connected to the rear transversal tube 27 at pivot point 136, and the other end fixedly connected to the rear transversal arm 121. The rear swing arm 120 is free to rotate about the pivot point 136, but it is contemplated that the rear swing arm 120 could have one or more stoppers so as to restrict its motion past a predetermined angular limit. The pivot point 136 of the rear swing arm 120 is horizontally aligned with the pivot point 130 of the front swing arm 110 along the horizontal 1. It is contemplated, however, that the pivot point 136 could be higher or lower than the pivot point 130. The pivot point 136 of the rear swing arm 120 is longitudinally offset from the pivot point 130 of the front swing arm 110. It is contemplated, that the pivot point 136 could be longitudinally aligned with the pivot point 130.

The right drive wheel 34 for the right track 14 is rotatably connected to the rear transversal arm 121, so that the right drive wheel 34 can rotate on its axis when driven by the drive chain 74. The rear transversal arm 121 is press-fit to the rear swing arm 120. It is contemplated that the rear transversal arm 121 could be bolted to or integrally formed with the rear swing arm 120. The rear transversal arm 121 positions the right drive wheel 34 so that the right drive wheel 34 runs on the central portion of the inner surfaces 19 of the endless belts 21 defined between the two rows of alignment members 51. The right drive wheel 34 has notches 35 on each side thereof that mate with inner sides of the alignment members 51. It is contemplated that the right drive wheel 34 could run on a different portion of the endless belt 21.

Figure 7:
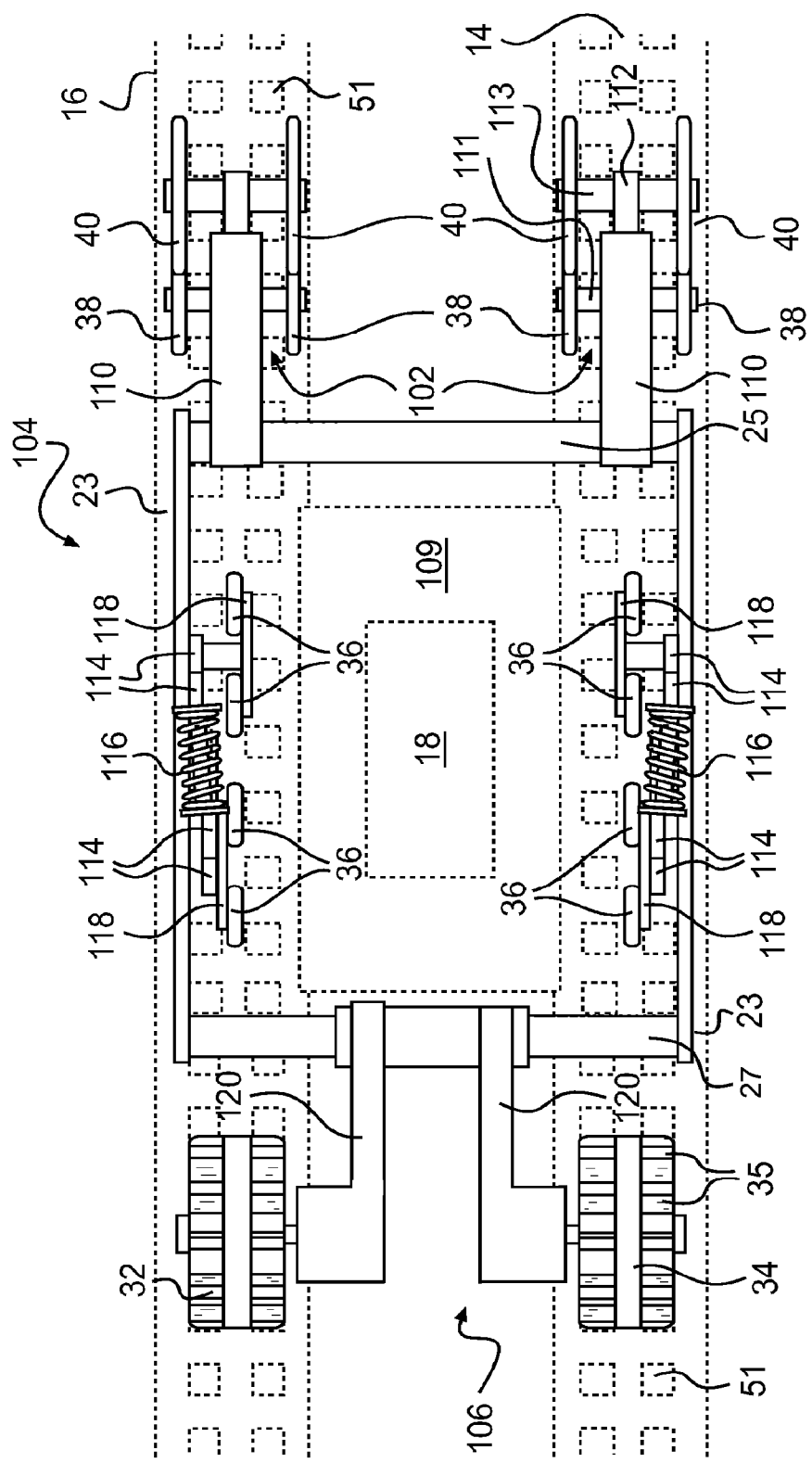
FIG. 7 is a top plan view of another embodiment of the suspension assembly of the vehicle of FIG. 1 with tracks of the vehicle shown in dotted lines for clarity.

It is contemplated that the rear suspension assembly could include an independent right and left rear suspension assembly. In some embodiments, the rear transversal arm 121 includes a right rear transversal arm and a left rear transversal arm respectively connected to the right and left drive wheels, thereby forming an independent left and right rear suspension assembly. In other embodiments, the rear transversal tube 27 comprises a separate left and right transversal tube 27, with the right and left rear swing arms 120 each being pivotably connected to one of the two tubes of the rear transversal tube 27 also thereby forming an independent left and right rear suspension assembly. In some embodiments, the rear transversal arm is omitted, as can be seen in FIG. 7. With reference to the embodiment of FIGS. 8 and 9, the rear swing arm 120 is directly connected to the drive wheel 34. As can best be seen in FIG. 9, the rear swing arm 120, at one end, has a U-shaped flange 122 with two arms for connecting to the drive wheel 34. At the opposite end, the rear swing arm 120 has two flanges 123 with apertures 27' adapted to receive the transversal tube 27. The drive wheel 34, is disposed between the two arms of the U-shaped flange 122 is connected to the arms on either side so as to be able to rotate about its axis.

Left and right rear shock absorbers 124 (only the right one being shown in FIGS. 2 and 5) has one end pivotally connected to the rear swing arm 120 and another end pivotally connected to the housing 20. The rear shock absorbers 124 transmit the weight of the user to the rear suspension assembly 106, especially when the user leans on the rearward portion 26 of the platform 12. It is contemplated that the rear suspension assembly 106 could only have one or more than two rear shock absorbers 124. It is contemplated that the rear shock absorber 124 could be placed somewhere else on the vehicle 10. It is contemplated that the rear shock absorbers 124 could be connected to the longitudinal arms 23 and/or to the rear swing arm 120. It is contemplated that the rear shock absorber 124 could not be directly connected to the housing 20 and/or to the rear swing arm 120.

When the vehicle 10 is at rest on a flat ground, the rear swing arm 120 is disposed at an angle 8 with respect to the horizontal 1. The angle 8 is disposed below the horizontal 1 so as to maintain a tension in the right track 14. When the rear swing arm 120 is positioned above the horizontal 1, the right track 14 is less tensioned than when disposed below the horizontal 1. This situation may occur when the vehicle 10 is driven on a sudden sharp irregularity. As the ground presents irregularities, the rear swing arm 120 rotates in directions 154 (upwards for a raised irregularity and downward for a lowered irregularity) to accommodate these irregularities.

Figure 5:
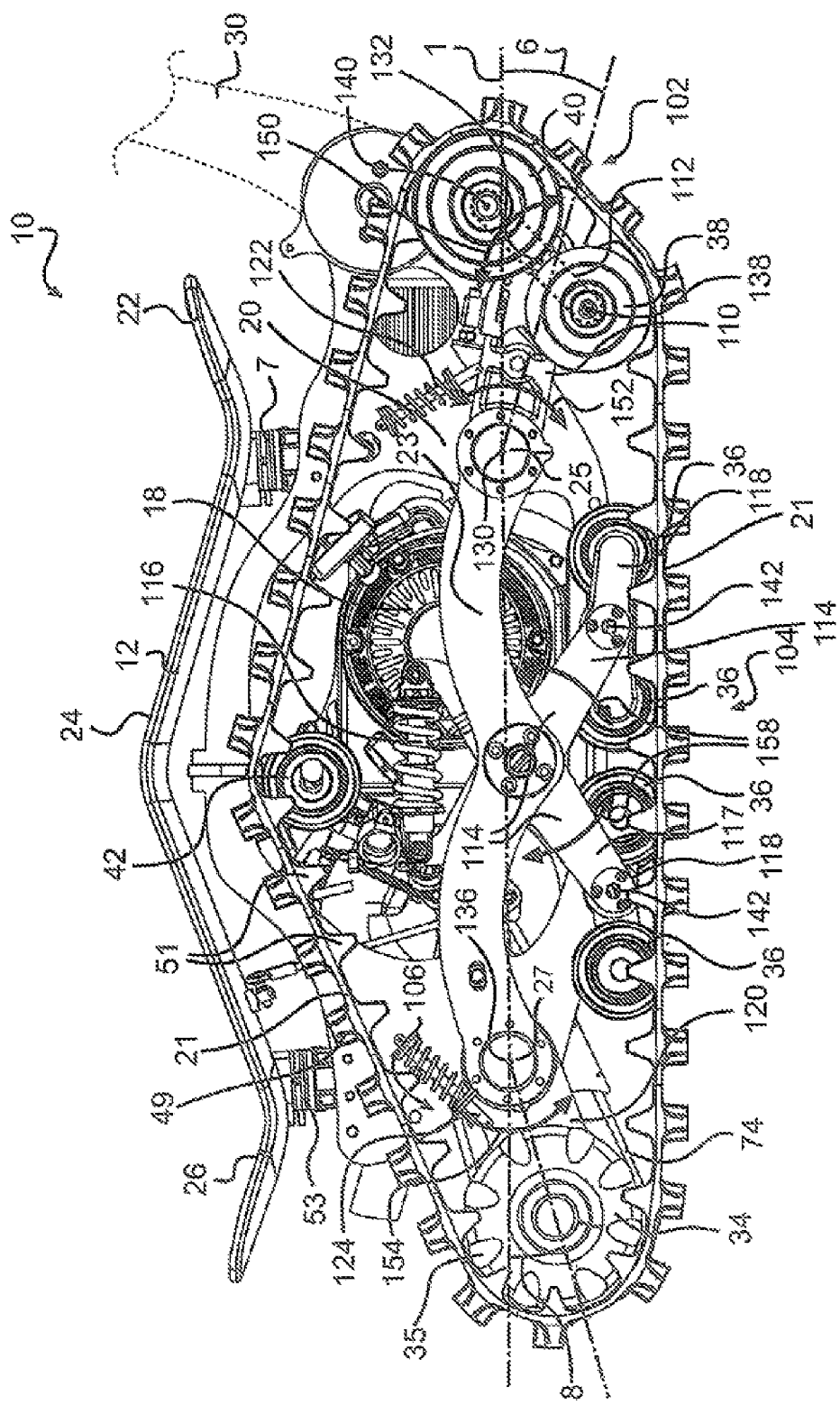
FIG. 5 is a right side elevation view of the vehicle of FIG. 1 with the handlebar shown partially in dotted lines.

Still referring to FIGS. 5 and 6, the middle suspension assemblies 104 will be described in detail. The left middle suspension assembly 104 being a mirror image of the right middle suspension assembly 104, only the right middle suspension assembly 104 will be described herein.

The right middle suspension assembly 104 includes a pair of swing arms 114 and the idler wheels 36. The swing arms 114 are made of aluminum, and the idler wheels 36 are made of plastic. It is contemplated that the swing arms 114 and the idler wheels 36 could be made of different materials.

Figure 8:
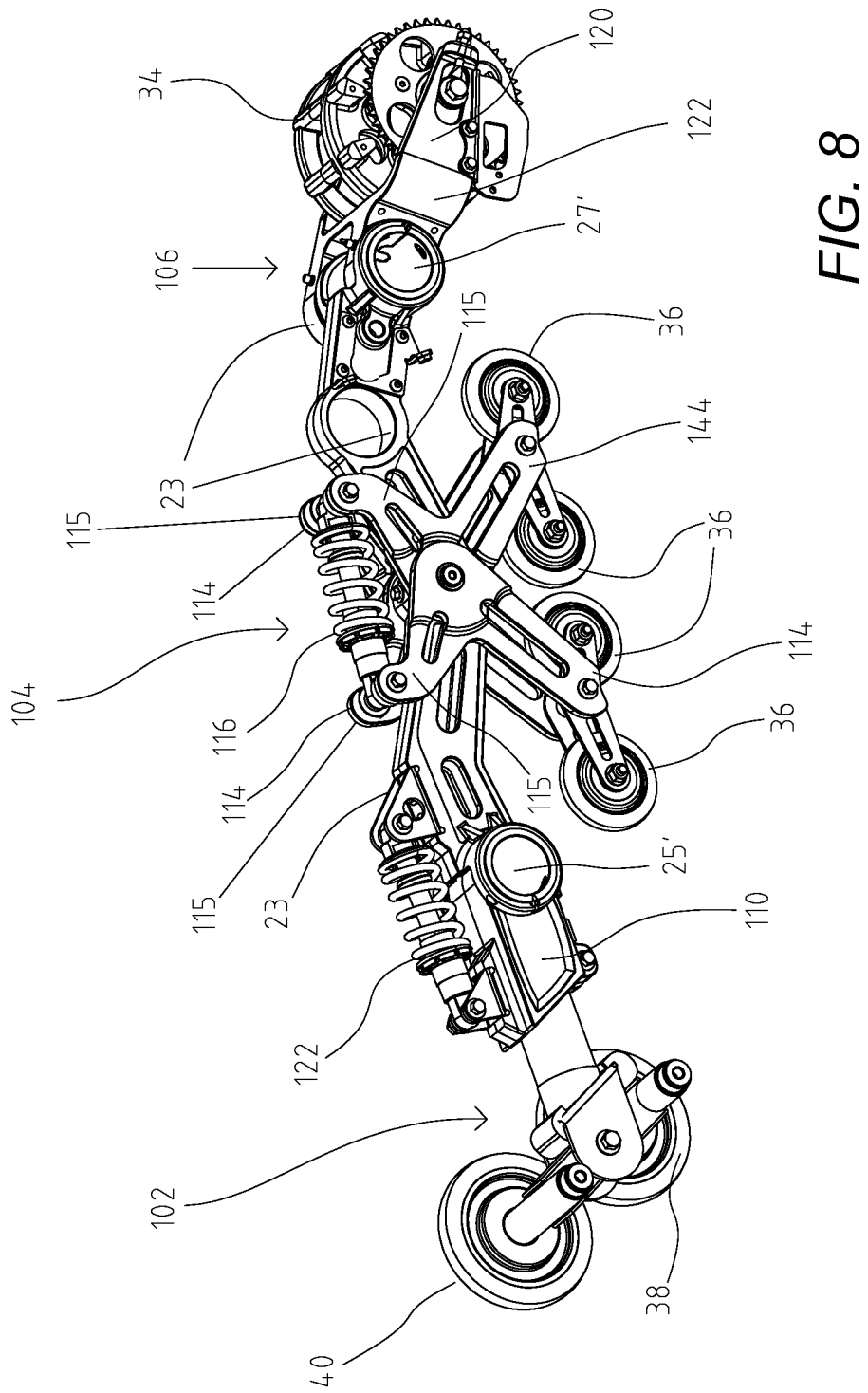
FIG. 8 is a perspective view taken from a top, left side of a right suspension assembly according to yet another embodiment.
Figure 9:
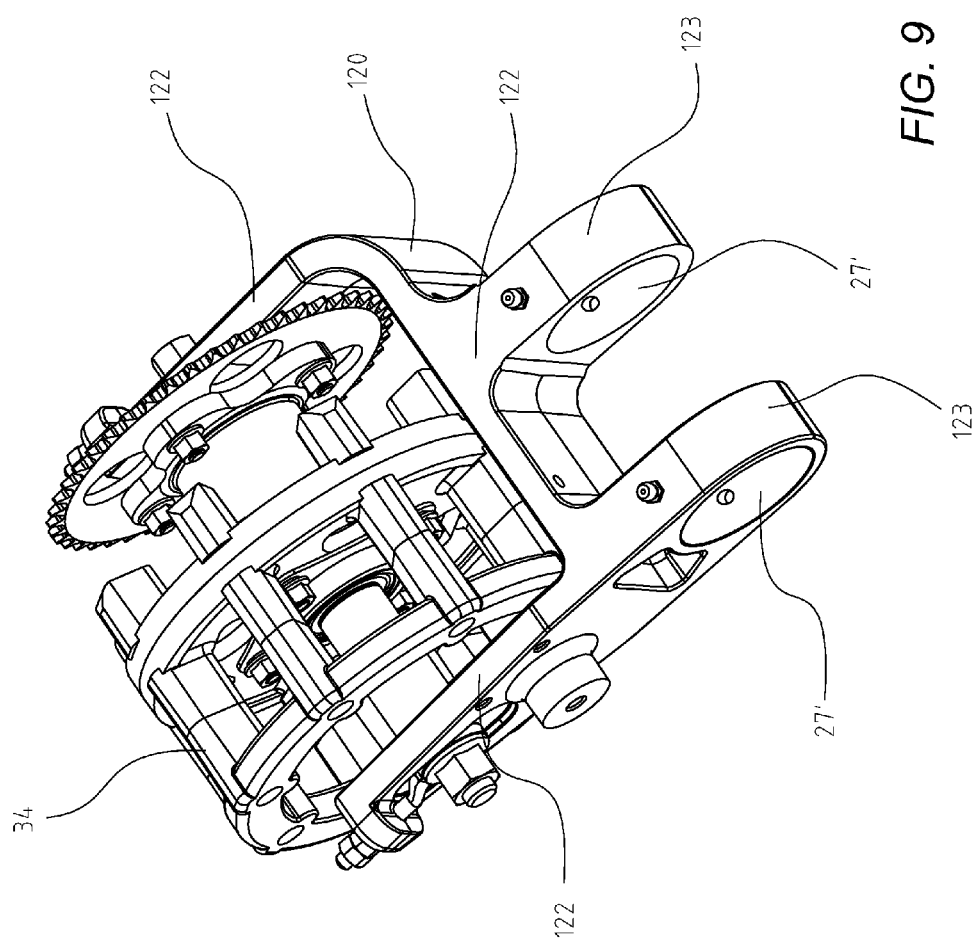
FIG. 9 is a perspective view taken from a top, right side of the rear swing arm of the right suspension assembly of FIG. 8.

The swing arms 114 of the pair of swing arms 114 are pivotally connected to each other at pivot point 134. It is contemplated that the swing arms 114 could be indirectly connected to each other via, for example, a static link. The pivot point 134 is disposed about half length of each swing arm 114, so that the swing arms 114 form an X. It is contemplated that the pivot point 134 could be disposed toward a top or a bottom of each of the swing arms 114. A shock absorber 116 extends between upper ends 115 of the swing arms 114. Lower ends 117 of the swing arms 114 are pivotally connected to the idler wheels 36. Each lower end 117 is pivotally connected to a L-shaped arm 118 at pivot points 142. Ends of the L-shaped arms 118 have an idler wheel 36 rotatably connected thereto, such that the right middle suspension 104 includes a total of four idler wheels 36. The idler wheels 36 run on the inner surface 19 of the endless belt 21 between the two rows of alignment members 51. It is contemplated that the idler wheels 36 could run on a different portion of the endless belt 21. It is contemplated that the right middle suspension 104 could include less or more than four idler wheels 36. It is contemplated that the right middle suspension 104 could include only one swing arm 114, and that the shock absorber 116 could be connected to the swing arm 114 and the housing 20. It is contemplated that the L-shaped arm 118 could include two arms, each arm being connected to an idler wheel 36. It is contemplated that the middle suspension assembly 104 could have more than one shock absorber 116. It is also contemplated that the shock absorbers 116 could be connected somewhere on the swing arms 114. It is also contemplated that each swing arm 114 comprises two laterally adjacent swing arms 114 connected to opposite sides of the idler wheel 36 or two laterally adjacent idler wheels 36 as seen in FIG. 8. The adjacent swing arms 114 are connected to laterally adjacent sides of the shock absorber 116. It is contemplated that they could also be connected to two laterally adjacent shock absorbers 116. The longitudinal arms 23 are sandwiched between the laterally adjacent swing arms 114. It is further contemplated that there could be two (or more) laterally adjacent longitudinal arms 23. The laterally adjacent longitudinal arms 23 could sandwich laterally adjacent swing arms 114, or be sandwiched by the laterally adjacent swing arms 114.

As the ground presents an irregularity, the idler wheels 36 rotate in directions 156 (upwards for a raised irregularity and downward for a lowered irregularity), and the swing arms 114 in directions 158 (upwards for a raised irregularity and downward for a lowered irregularity) to accommodate these irregularities. The shock absorber 116 is so dimensioned that for a small irregularity of the ground, it acts as a solid link and the arms 118 would only pivot about the swing arms 114 in the directions 156, but is also dimensioned to compress and expand when the vehicle 10 encounters a bigger irregularity, so that the swing arms 114 pivot in the directions 158.

Embodiments comprising independent as well as coupled suspension assemblies for dual-track vehicles 10 are within the scope of the present disclosure. In some embodiments of suspension assemblies, the left and right front suspension assemblies are coupled, for example, by connecting the left and right front arms 112, or the left and right swing arms 110, of the right and left front suspension assemblies. In some embodiments, the left and right middle suspension assemblies are coupled. It is contemplated that the left and right sides of any one or more of the front, rear, and rear suspension assemblies could be coupled.

The disclosure is not intended to be limited to any particular combination of drive wheels and idler wheels, but to apply generally to wheels, where the wheels could be either drive wheels or idler wheels. It is contemplated that the location of the drive wheels 34 and idler wheels 36, 38, 40, 42 could be interchanged. Any one of the idler wheels 36, 38, 40, 42 could be a drive wheel operatively connected to the engine. For example, the drive wheels 34 could be located in the front of the vehicle and front swing arm 110 of the front suspension assembly connected to the drive wheels instead of the idler wheels while rear swing arm 120 of the rear suspension assembly is connected to the idler wheels 38, 40 instead of the drive wheels 34. It is contemplated that the front suspension assembly 102 connected to the idler wheels 38, 40 could be located in the rear portion of the vehicle 10 with the rear suspension assembly 106 connected to the drive wheels 34 disposed in the front portion of the vehicle 10. It is also contemplated that there could be more than one drive wheel contacting each track. It is further contemplated that the suspension assembly is connected to the track only by idler wheels, and the drive wheel could be located elsewhere on the track.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A suspension assembly for a personal tracked vehicle, the suspension assembly comprising:
   a first swing arm adapted to be pivotally connected to a frame of the vehicle, the first swing arm having a first end and a second end, wherein the first swing arm is adapted to be pivotally connected to at least one longitudinal arm, the at least one longitudinal arm being connected to the frame of the vehicle;
   a second swing arm pivotally connected to the first swing arm, the second swing arm having a first end and a second end; and
   at least one shock absorber connected to the first and second swing arms;
   the first ends of the first swing arm and the second swing arm being respectively adapted for rotatable connection of at least one first wheel and at least one second wheel thereto.

2. The suspension assembly of claim 1, wherein the second swing arm is pivotally connected to the first swing arm at a pivot point disposed at about half-length of the first and second swing arms.

3. The suspension assembly of claim 1, wherein the at least one shock absorber interconnects the second ends of the first and second swing arms.

4. The suspension assembly of claim 1, wherein the at least one shock absorber comprises a spring and a damper.

5. The suspension assembly of claim 1, further comprising at least one connecting arm adapted for rotatable connection of two wheels thereto, the at least one connecting arm being pivotally connected to the first end of one of the first and second swing arms.

6. The suspension assembly of claim 1, further comprising a second suspension assembly, the second suspension assembly comprising:
- a second suspension swing arm adapted to be pivotally connected to the frame via the at least one longitudinal arm, the second suspension swing arm having an end;
- the end of the second suspension swing arm being adapted for rotatable connection of a wheel thereto; and
- at least one second suspension shock absorber connected to the second suspension swing arm, the at least one shock absorber being adapted to be connected to the frame via the at least one longitudinal arm.

7. The suspension assembly of claim 1, further comprising:
- the at least one first wheel rotatably connected to the first end of the first swing arm, the at least one first wheel being adapted to be in contact with a track of the vehicle; and
- the at least one second wheel rotatably connected to the first end of the second swing arm, the at least one second wheel being adapted to be in contact with the track of the vehicle.

8. The suspension assembly of claim 7, wherein:
- the at least one first wheel is one of an idler wheel and a drive wheel adapted to be operatively connected to an engine; and
- the at least one second wheel is one of an idler wheel and a drive wheel adapted to be operatively connected to an engine.

9. The suspension assembly of claim 1, wherein:
- the first swing arm is a plurality of first swing arms and the at least one first wheel is a plurality of first wheels; wherein
  - each of the plurality of first swing arms is adapted to be pivotally connected to the frame of the vehicle;
  - each of the plurality of first swing arms has a first first swing arm end and a second first swing arm end; and
  - the first ends of the first swing arms are adapted for rotatable connection of at least one of the plurality of first wheels thereto;
- the second swing arm is a plurality of second swing arms and the at least one second wheel is a plurality of second wheels; wherein
  - each of the plurality of second swing arms is pivotally connected to at least one of the first swing arms;
  - each of the plurality of second swing arms has a first second swing arm end and a second second swing arm end; and
  - the first ends of the second swing arms are adapted for rotatable connection of at least one of the plurality of second wheels thereto; and
- the at least one shock absorber is connected to the plurality of first and second swing arms.

10. The suspension assembly of claim 9, wherein:
the at least one shock absorber is connected to the second ends of
- one of the first swing arms, and
- one of the second swing arms.

11. The suspension assembly of claim 9, wherein:
the at least one shock absorber interconnects
- one of the first swing arms, and
- one of the second swing arms.

12. The suspension assembly of claim 9, wherein:
- the at least one shock absorber has a first end and a second end;
- the first end of the at least one shock absorber is connected to one of the first swing arms at the second end thereof; and
- the second end of the at least one shock absorber is connected to one of the first swing arms at the second end thereof.

13. The suspension assembly of claim 9, wherein:
- the at least one shock absorber has a first shock absorber end and a second shock absorber end;
- the first end of the shock absorber interconnects two of the first swing arms; and
- the second end of the shock absorber interconnects two of the second swing arms.

14. The suspension assembly of claim 13, wherein the two first swing arms interconnected by the shock absorber are further adapted:
- to receive the at least one longitudinal arm therebetween; and
- to be pivotally connected to the at least one longitudinal arm.

15. A personal stand-up dual tracked vehicle comprising:
- a frame;
- an engine connected to the frame;
- a platform connected to the frame for accommodating a user thereon;
- a left and right track operatively connected to the engine; and
- a right and left suspension assembly, each movably supporting the respective one left and right track, each suspension assembly including:
  - a first swing arm pivotally connected to the frame, the first swing arm having a first end and a second end, wherein the first swing arm is adapted to be pivotally connected to at least one longitudinal arm, the at least one longitudinal arm being connected to the frame of the vehicle;
  - a second swing arm pivotally connected to the first swing arm, the second swing arm having a first end and a second end; and
  - at least one shock absorber connected to the first and second swing arms;
- the first ends of the first swing arm and the second swing arm being adapted for rotatable connection of a wheel thereto;
- at least one first wheel rotatably connected to the first end of the first swing arm, the at least one first wheel contacting the respective track; and
- at least one second wheel rotatably connected to the first end of the second swing arm, the at least one second wheel contacting the track.

* * * * *